United States Patent

Greenfield, deceased

[15] 3,637,186
[45] Jan. 25, 1972

[54] DETENT SWIVEL FOR TRUCK MIRRORS AND THE LIKE

[72] Inventor: Alec Greenfield, deceased, late of Chicago, Ill. by Dorothy M. Greenfield, executrix

[73] Assignee: Avnet, Inc., New York, N.Y.

[22] Filed: Oct. 16, 1969

[21] Appl. No.: 867,105

[52] U.S. Cl. ................................. 248/478, 248/289, 287/14
[51] Int. Cl. ............................................................. B60r 1/06
[58] Field of Search ........................ 248/289, 293, 477, 478; 287/14; 306/11, 14, 16, 17

[56] References Cited

UNITED STATES PATENTS 2,486,583  11/1949  Walklet ........................... 287/14 X
2,969,715  1/1961  Mosby .............................. 248/478
3,339,876  9/1967  Kampa ............................. 248/478

Primary Examiner—William H. Schultz
Attorney—W. R. Hulbert

[57] ABSTRACT

Relatively pivotable detent members for holding positions of adjustment in rearview truck mirrors and the like. The detent members may take the form of circular stamped plates having a central depression forming a well surrounded by a flange in which are troughlike detent formations adapted to nest in assembly and to snap into and out of interfit when the members are pivoted one relative to the other. Metal is removed in critical locations on the flange, as by formations of slots and perforations to impart a limited springiness to each flange portion or the detent formations or both.

12 Claims, 9 Drawing Figures

INVENTOR
Alec Greenfield deceased
By Dorothy Greenfield Executrix
BY
ATTORNEY.

PATENTED JAN 25 1972

INVENTOR.
Alec Greenfield deceased
BY Dorothy Greenfield Executrix
BY
ATTORNEY.

DETENT SWIVEL FOR TRUCK MIRRORS AND THE LIKE

Rearview mirrors adapted for mounting on the outside of a truck cab or the like are commonly provided with adjustable mounting fixtures permitting the mirror itself to be pivoted to a selected viewing angle and also permitting angular adjustment of other parts of the supporting structure, brackets or the like. In some of the larger heavy duty outboard mirror installations a part of the bracket and supporting assembly which is formed is a subassembly carries the mirror and is pivoted to swing inwardly and outwardly of the vehicle body or can so that the mirror unit can be retracted quickly to avoid damage in passing obstructions and then be quickly returned to the normal driving position. For such purposes various detent arrangements are provided to secure the mirror unit yieldingly in any of several selectable driving positions, including the retracted position.

A number of detent structures have been devised for use under the conditions described, some of which, if otherwise effective, are relatively complex and costly to manufacture, and other of which tend to be too stiff in operation or incapable of consistently holding position under rugged driving conditions or over a period of time.

In accordance with the present improvements, a pivotal detent means is provided which is quite simple in construction, economical to manufacture, readily responsive to adjusting movements, reliably firm when adjusted, and capable of long service not only in conjunction with automobile and truck mirrors, but in other applications employing this class of pivotal detent as well.

Two preferred forms of the detent means are described hereinafter in view of the annexed drawings in which.

Figure 1:
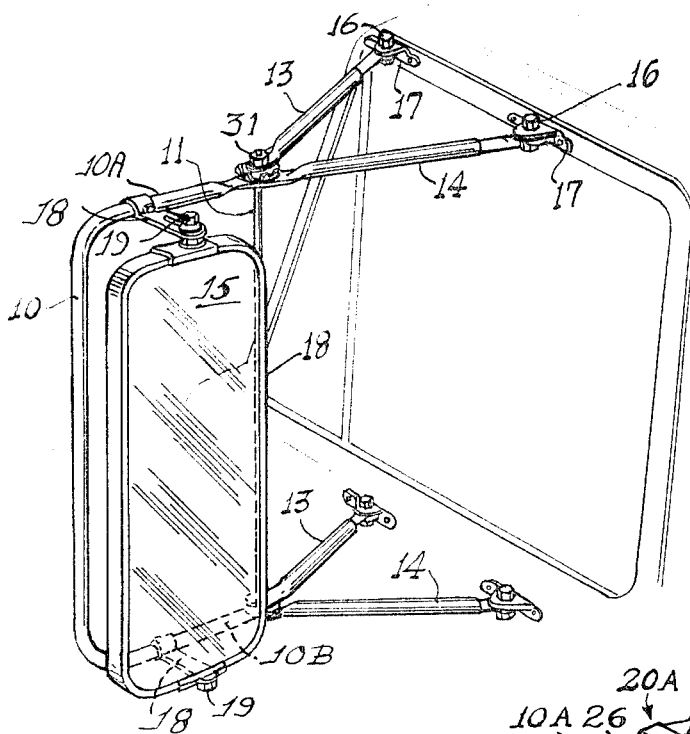
FIG. 1 is a fragmentary perspective view showing the cab mounting of one type of outboard truck mirror employing the novel detent means.

The type of mirror installation depicted in FIG. 1 is adapted for outboard mounting on the cab or the like of a large truck, and comprises a mirror carrier unit including a swinging loop 10 in the form of a U-shaped tubular member having its ends flattened and pierced for pivotal connection, as by means of a pivot rod 11 extending through the similarly flattened and lapped ends of upper and lower pairs of tubular outboard bracing and supporting arms 13 and 14.

The innermost ends of the several supporting tubes are likewise flattened and pierced for attachment, as by bolts 16, to body or cab mounting cleats 17 affixed to the vehicle. A rearview mirror 15 is pivotally supported between the upper and lower arms 10A, 10B of the swing loop 10 by means of clamping arms 18 between which the mirror is suspended by attachment with clamping nuts 19 so that it can be set in a relatively fixed position within the loop, while the loop itself can be pivotally adjusted in turn by reason of the pivotal detent means to be described and the connection afforded at the rod 11.

The swing loop or mirror carrier subassembly itself must be readily responsive to deliberate manual pivoting effort when it becomes necessary for the driver to retract the mirror quickly for any reason, for example, to clear an obstruction, and it must be equally responsive to efforts to return the mirror to the normal driving and viewing position, it being the function of the detent means described hereinafter to afford such selectable positioning and adjusting movements in any of several types of truck mirror.

Figure 2:
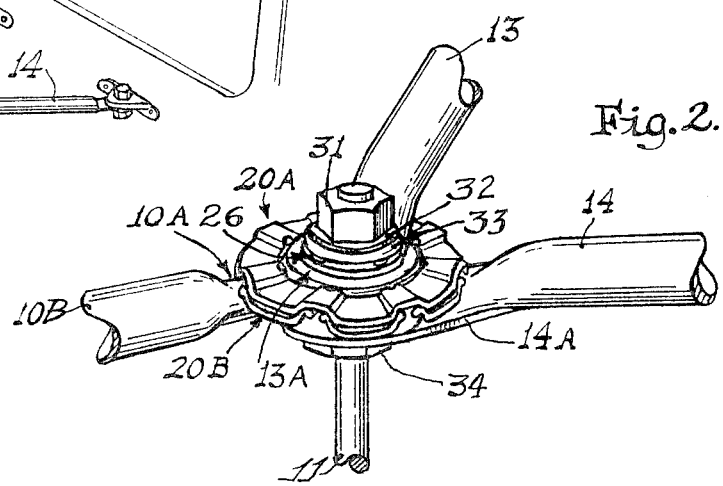
FIG. 2 is a partial perspective detail, to enlarged scale, of the detent means employed in the mirror of FIG. 1.
Figure 3A:
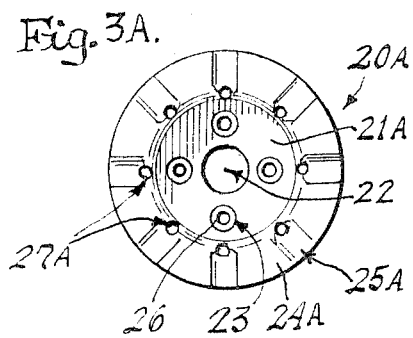
FIGS. 3A and 3B are plan views of the detent discs seen in FIG. 3.
Figure 3B:
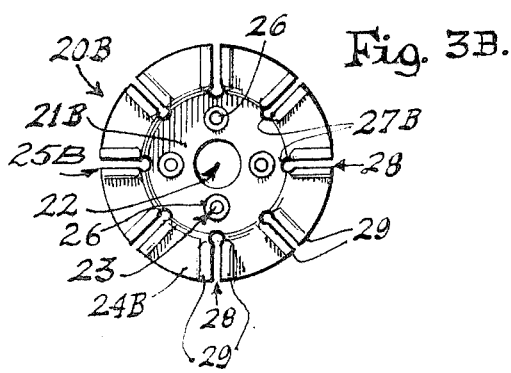
Figure 7:
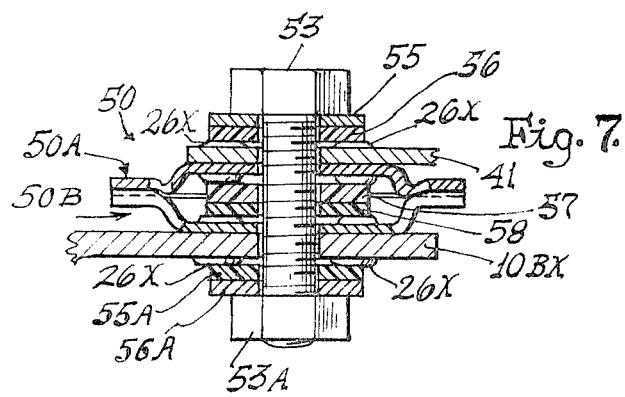
FIG. 7 is a sectional detail of the assembly of FIG. 5.

The components of the novel detent structure are few and comprise essentially, as seen in FIGS. 3A and 3B, a pair of complementary detent members 20A and 20B, each preferably having the form of a circular washerlike plate having a dished or depressed central cavity 21A or 21B defining a shallow well in which are respective central perforations 22 to receive a pivot member such as the rod 11 (FIG. 2) or a bolt means 53, as in the assembly of FIG. 7.

Figure 3:
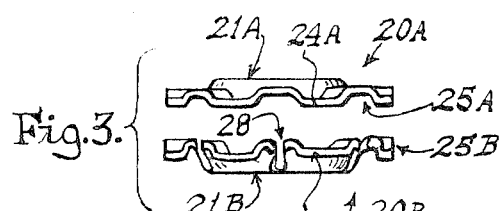
FIG. 3 is an elevational detail of the pair of companion detent members shown in FIG. 2 but in separated relationship.

Each detent plate has a wide circumambient flange or rim portion 24A or 24B surrounding its centrally dished portion, and in each case these flanges (FIG. 3B) are provided with a series of relatively "reversed" complementary undulations having the preferred form of angularly spaced, elongated troughs or channels 25A or 25B extending radially from and through the outer periphery of the respective flanges to the circular line of inflexion or bend defining the margin between the central cavity or well and its juncture with the appertaining flange formation, it being noted however that such trough formations are relatively reversed in the two washerlike plates in the respect that those in the upper plate 20A (seen in FIG. 3) open at the top along their length in the same direction as the open side of the appertaining well portion, while the trough formations in the companion detent member 20B open oppositely or downwardly toward the bottom of the corresponding well, with the result that when the two detent members are superposed in their relative inverted cooperative relationships and orientation, as shown in FIGS. 2 and 3, the respective trough formations of one detent member can interfit with or nest in those of the other in such manner that when one member is pivotally turned relative to the other in the assembled condition of FIG. 2, for example, the protuberant or outstanding bottoms of one set of the trough formations can glide with a snap action into and out of the relatively recessed trough formations of the other; and to further facilitate this action certain relief formations are provided to afford a limited amount of springiness or yieldability and otherwise contribute a smooth detent interfit between said trough and flange parts.

The location and nature of the spring-action relief configurations are seen particularly in FIGS. 3A and 3B, the plate 20A in the former view being provided with small perforations 27A substantially at the inner terminus of each trough formation quite close to the line of bend between the flange and the well, and these perforations, taken empirically with a suitable thickness and hardness of metal or other material used, afford a very satisfactory and reliable gliding and detent action.

The companion detent member 20B (as seen in FIG. 3B) is likewise provided with similar angularly spaced relief perforations 27B situated identically to those in plate 20A; but in addition, elongated radially extensive slots 28 extend from and through the marginal relief perforations outwardly into the edge or periphery of the circumambient flange portion and produce dual detent tangs 29 which contribute a relatively greater amount of flexibility or yieldability in this member, the latter being preferably utilized as the stationary detent element of the pair relative to which the companion member will be rotated in the cooperative assembly of FIG. 2, as will further appear.

In the larger outboard type of mirror installation depicted in FIG. 1, the relatively stationary detent plate 20A at the upper pivot joint about rod 11 is attached by rivets 26 to the flattened end 13A (FIG. 2) of the uppermost one of the upper pair of supporting arms 13–14. In like manner the companion plate 20B is riveted to the flattened end 10A of the corresponding upper arm of the swing loop.

A second set of the detent plates will preferably be employed in the larger type of installation at the lower pivot joint. The necessary clamping action to press the pairs of plates together is afforded by capping nuts 31 or the like threaded onto the exposed ends of rod 11 and tightened against a metal washer 32 beneath which is another washer 33 of moderately compressible and preferably nonmetallic material, such as nylon, another stop nut 34 being provided on the underside of the assembly, FIG. 2; or, if desired, stop tabs (not illustrated) may be pinched out of the rod stock in known manner at this location to serve the like purpose.

Means for providing friction and limiting the compressive tension between the detent plates of each pair is contained within the chamber defined by the wells or depressed portions of the two plates comprising each set in their relatively inverted operative relationships, as illustrated in the sectional view of FIG. 7, in which the detent assembly is identical to the rod-mounted arrangement of FIG. 2, except for the replacement of the rod 11 by a pivot bolt 53, as will be further explained hereafter.

Referring to FIG. 7, two compressible washers 57, 58 of nylon or like material having some degree of yieldability are included in the well chamber and will be of sufficient thickness respectively to engage the inside bottom faces of the wells (with the rivet heads included) with several thousandths of an inch overage so as to provide a somewhat resilient and compressible backing against which the plates can be tensioned by turning up the nuts 53A or 31 until a desired snap-action tension is selected for the plates.

Figure 4:
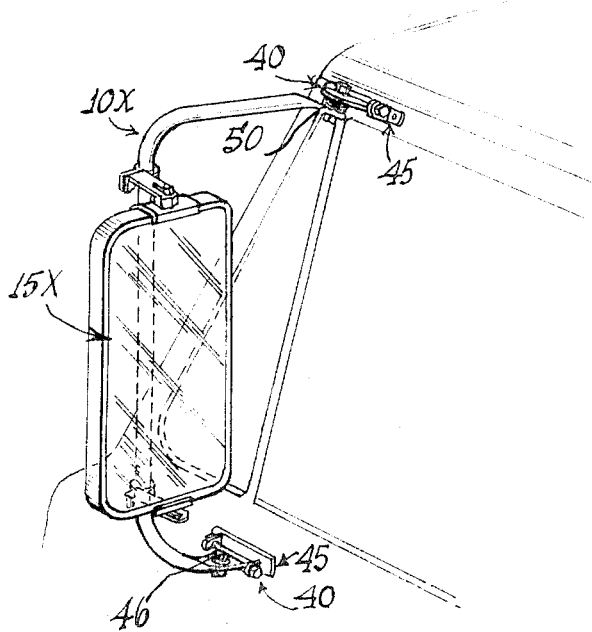
FIG. 4 is a partial perspective view showing the cab mounting of another type of truck mirror employing the novel detent means.
Figure 5:
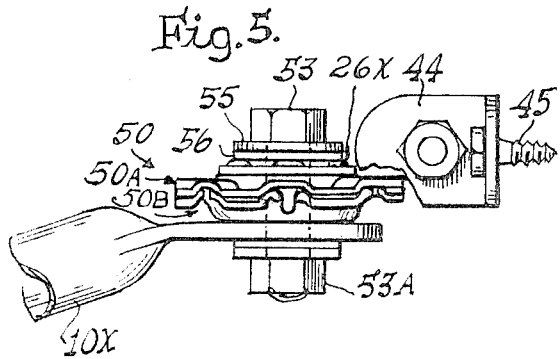
FIG. 5 is a fragmentary elevational detail, to enlarged scale, of the detent assembly for the mirror of FIG. 4.
Figure 6:
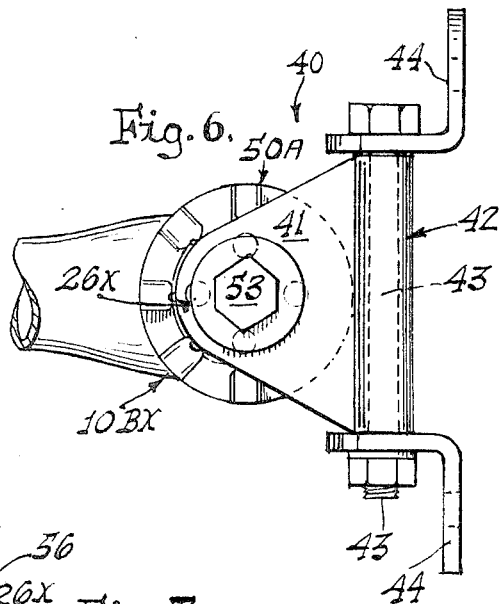
FIG. 6 is a top plan view of part of the assembly seen in FIG. 5.

A different and smaller type of mirror installation is shown in FIG. 4 wherein the outboard supporting arms 13, 14 are omitted and a similar mirror 15X is affixed to the bight of the swing loop 10X with the flattened ends of the latter engaging a different type of cab mounting bracket 40 having the construction shown to enlarged scale in FIG. 6 and comprising a stamping having a somewhat triangular plate portion 41 turned back upon itself to form a tubular sleeve section 42 pivotally supported on a pivot bolt 43 carried by angle brackets 44 situated at its opposite ends, said brackets being attached as at 45 by suitable screw means to the cab body, FIG. 4.

In such an installation, satisfactory operation may be had by using only one detent assembly of the type indicated at 50 in FIGS. 4 through 7, and which may preferably be located at the upper cab bracket, a simple pivot bolt means 46 being employed at the lower bracket, FIG. 4.

In general, the mirror 15X and its attachment to the swing loop 10X will be identical to that described for the device of FIG. 1, and the construction and operation of the detent plates and internally contained and concealed friction and tensioning means likewise may be identical to that heretofore described. Thus, referring to FIGS. 5 and 6, the uppermost detent plate 50A will be attached by rivet means 26X to the triangularly shaped portion 41 of the cab bracket, while the lowermost detent plate 50B will be similarly attached to the flattened end 10BX of the lowermost arm of the swing loop with the detent assembly clamped together by means of a bolt 53 (FIG. 7), the head of which bears against a metal washer 55 which in turn rides upon a moderately yieldable nylon or like friction washer 56 lodged upon the rivet heads 26X. A similar set of washers 55A, 56A is employed on the opposite side of the assemblage as seen in the section of FIG. 7.

The novel detent structure is not only adaptable to devices such as the illustrative rearview mirror, but to any analogously pivotable utility members wherein a first member, such as the mirror or its supporting arms, turns into selectable stable positions of adjustment relative to a second member such as the fixed support for the mirror.

The disclosed construction is economical to make and of a compact and simple character such that the pivot means for the utility members can also constitute part of the pivot and compressive clamping means 11, 31, 32 or 53, 53A, and coact with the attaching means 10, 13, 14 and flattened end portions thereof engaged with the bottoms of the cup portions of the respective detent members in a way to secure the combination in assembly, while containing concealed within the chamber formed by the inverted cup portions, the friction and compression-limiting washer means 57, 58.

Thus, the useful application of the disclosed detent means is not intended and not necessarily confined to use with vehicular mirrors and the like, which constitute only one illustrative utilitarian adaptation of the construction described, or as defined in the appended claims.

I claim:

1. Detent means for relatively pivotable utility devices wherein a first member, such as a rearview vehicular mirror is adapted to turn about a pivot axis into selected angular positions of stable adjustment relative to a second member such as a support for the mirror, said detent means comprising, namely: a pair of cup-shaped detent members each having an annular flange surrounding the opening into an appertaining central cup portion having a bottom wall opposite to said opening, each flange having disposed a series of radially elongated troughlike detent formations in angularly spaced relation thereabout concentrically of a turning axis extending at right angles to a plane containing the appertaining flange and extending centrally through the opening and bottom wall of the appertaining cup portion each opening at one radial end into the outer periphery of the appertaining flange portion, and respectively terminating at opposite inner radial ends close said detent formations comprising in one flange portion recesses and in the other flange portion protuberances formed to fit into the recesses of the juxtaposed flange portion; means securing said detent members in assembled cooperative relation with the respective flanges thereof in face-to-face juxtaposition and the respective cup portions thereof projecting in opposite directions, the recesses in one said flange confronting the protuberances in the opposite flange and adapted to interengage in detent action with said protuberances, said securing means providing a turning axis for said detent members and being operative to urge the flange formations together in a compressive clamping action while permitting relative turning thereof in detent action as aforesaid; and means for attaching each of said detent members to one of said relatively pivotable first and second members of the utility device; the material of the flange portion of at least one of said detent members being perforated along substantially the length of the appertaining troughlike formations whereby to contribute to yieldability of the corresponding flange portions for detent action as aforesaid.

2. A construction according to claim 1 wherein the perforation of the troughlike formations takes the form of a radial slot extending along a substantial part of the length of the bottom of the said troughlike formations and said slot opens into the outer periphery of the appertaining flange portion.

3. The construction of claim 2 further characterized in that the inner ends of the said slots terminate in the perforations at the region of the conjunction between the appertaining flange portion and cup portion, as aforesaid.

4. Detent means for rearview vehicle mirrors and analogous devices wherein a first member such as a mirror structure is pivotally mounted on a second member such as a fixed supporting means to turn about a pivot axis through a range of adjustment positions in which the first member is yieldingly held by the detent means, said detent means comprising, namely: a pair of cup-shaped detent members each having a cup portion with a bottom wall, a surrounding sidewall portion, and an open top bordered by an annular flange, said flanges respectively having complementary interfitting detent cavities and protrusions, the said protrusions in at least one detent member being provided with radially elongated slots opening into the periphery of the appertaining flange portion, whereby to provide dual tangs for each such protrusion; and the detent members being assembled with their respective flanges in face-to-face contact and the respective cup portions thereof mutually inverted so as to define a closed chamber, with a turning axis passing centrally through the respective bottom walls of said cup portions such that turning of one detent member relative to the other will cause the protruding detent formations of one said member to ride into and out of the complementary formations of the other said member in detent action; means operative to hold the detent members in assembly as aforesaid with a desired compressive tension acting therebetween in the direction of said turning axis for determining the force required to turn the same in detent action as aforesaid; and means attaching each said detent member to a different one of said first and second relatively pivotable members with the pivot axis of the latter concentric with said turning axis of the detent members.

5. Detent means for rearview vehicle mirrors and analogous devices wherein a first member such as a mirror structure is pivotally mounted on a second member such as a fixed supporting means to turn about a pivot axis through a range of adjustment positions in which the first member is yieldingly held by the detent means, said detent means comprising, namely: a pair of cup-shaped detent members each having a cup portion with a bottom wall, a surrounding sidewall portion, and an open top bordered by an annular flange, said flanges respectively having complementary interfitting detent cavities and protrusions; said cavities and protrusions respectively terminating at their inner ends in widened portions situated at the conjunction of the appertaining flange portion and cup portions, and at least some of said protrusions being provided with radially elongated slots opening into the periphery of the appertaining flange portion and terminating respectively in the corresponding said widened portions; and the detent members being assembled with their respective flanges in face-to-face contact and the respective cup portions thereof mutually inverted so as to define a closed chamber, with a turning axis passing centrally through the respective bottom walls of said cup portions such that turning of one detent member relative to the other will cause the protruding detent formations of one said member to ride into and out of the complementary formations of the other said member in detent action; means operative to hold the detent members in assembly as aforesaid with a desired compressive tension acting therebetween in the direction of said turning axis for determining the force required to turn the same in detent action as aforesaid; and means attaching each said detent member to a different one of said first and second relatively pivotable members with the pivot axis of the latter concentric with said turning axis of the detent members.

6. Detent means for rearview vehicle mirrors and analogous devices wherein a first member such as a mirror structure is pivotally mounted on a second member such as a fixed supporting means to turn about a pivot axis through a range of adjustment positions in which the first member is yieldingly held by the detent means, said detent means comprising, namely: a pair of cup-shaped detent members each having a cup portion with a bottom wall, a surrounding sidewall portion, and an open top bordered by an annular flange, said flanges respectively having complementary interfitting detent cavities and protrusions and the detent members being assembled with their respective flanges in face-to-face contact and the respective cup portions thereof mutually inverted so as to define a closed chamber, with a turning axis passing centrally through the respective bottom walls of said cup portions such that turning of one detent member relative to the other will cause the protruding detent formations of one said member to ride into and out of the complementary formations of the other said member in detent action; means operative to hold the detent members in assembly as aforesaid with a desired compressive tension acting therebetween in the direction of said turning axis for determining the force required to turn the same in detent action as aforesaid; means concealed within said chamber and situated along said axis in contact with portions on the inner sides of the bottoms of said cup portions operative to limit the compressive action aforesaid; and means attaching each said detent member to a different one of said first and second relatively pivotable members with the pivot axis of the latter concentric with said turning axis of the detent members.

7. The construction of claim 6 wherein said means for limiting compressive action comprises at least one disclike element of a synthetic plastic material which is penetrated by said securing means.

8. Detent means for relatively pivotable utility devices wherein a first member, such as a rearview vehicular mirror is adapted to turn about a pivot axis into selected angular positions of stable adjustment relative to a second member such as a support for the mirror, said detent means comprising a pair of relatively rotatable cup-shaped detent members each having an annular flange surrounding the opening into an appertaining central cup portion having a bottom wall opposite to said opening, each flange formed of a plurality of radially extending alternating detents and protuberances, all of said detents having extended wall regions lying in one plane, and all of said protuberances having extended wall regions lying in another plane, parallel to the plane of said detents, but spaced apart therefrom, and transverse wall portions connecting said detents and protuberances, the protuberances of each said flange adapted to be received in the detents of the other said flange; means securing said detent members in assembled cooperative relation with the respective flanges thereof in face-to-face juxtaposition and the respective cup portions thereof projecting in opposite directions, the protuberances in each said flange being received in the detents of the other said flange; at least some of said transverse wall portions of one flange being engaged with transverse wall portions of the other flange along regions extending in one direction radially of said flanges across substantially the entire radial width thereof and in the other direction transverse to the said planes of said detents and protuberances, said securing means providing a turning axis for said relatively rotatable detent members and being operative to urge the flange formations together in a compressive clamping action while permitting relative turning thereof in detent action as aforesaid; and means for attaching each of said detent members to one of said relatively pivotable first and second members of the utility device.

9. Detent means according to claim 8 wherein the material of the respective flange portions of the detent members is perforated in the region of said conjunction whereby to contribute to yieldability of the corresponding flange portion for detent action as aforesaid.

10. Detent means according to claim 8 wherein said means securing the detent members in assembly includes a pivot member extending centrally through the bottoms of both cup portions in the assembled condition of the detent members, and threaded means working on said pivot member to apply the compressive urging action aforesaid.

11. A construction according to claim 8 further characterized by the provision of means concealed within a closed chamber formed by the responsive cup portions of said detent members and operative to provide resistance of limited yieldability to oppose said compressive clamping action.

12. A detent construction according to claim 8 wherein said attaching means comprises for each detent member a flat portion at an end of a support element for the respective first and second utility members, and means attaching said respective flat portions to the outer side of the bottom wall of an appertaining one of said cup portions, the said securing means including a rodlike pivot member extending along said pivot and turning axes through said bottom walls and the respective flat portions of said support elements.

* * * * *

UNITED STATES PATENT OFFICE
CERTIFICATE OF CORRECTION

Patent No. 3,637,186                    Dated January 25, 1972

Inventor(s) Alec Greenfield

It is certified that error appears in the above-identified patent and that said Letters Patent are hereby corrected as shown below:

Column 1, line 12, change "can" to --cab--.
Column 4, line 23, after "close" insert --to the conjunction of the appertaining flange and cup portions,--.
Column 6, line 55, change "responsive" to --respective--.

Signed and sealed this 15th day of August 1972.

(SEAL)
Attest:

EDWARD M. FLETCHER, JR.          ROBERT GOTTSCHALK
Attesting Officer                Commissioner of Patents